(12) United States Patent
Fleischer et al.

(10) Patent No.: US 9,346,112 B2
(45) Date of Patent: May 24, 2016

(54) METHOD FOR PRODUCING TOOTHED SECTIONS ON WORKPIECES

(75) Inventors: Holger Fleischer, Augustusburg (DE); Mario Wiesel, Schwansee (DE)

(73) Assignee: MAG IAS GmbH, Goppingen (DE)

( * ) Notice: Subject to any disclaimer, the term of this patent is extended or adjusted under 35 U.S.C. 154(b) by 153 days.

(21) Appl. No.: 14/110,186

(22) PCT Filed: Apr. 5, 2012

(86) PCT No.: PCT/EP2012/056295
§ 371 (c)(1),
(2), (4) Date: Nov. 1, 2013

(87) PCT Pub. No.: WO2012/136774
PCT Pub. Date: Oct. 11, 2012

(65) Prior Publication Data
US 2014/0053405 A1    Feb. 27, 2014

(30) Foreign Application Priority Data

Apr. 7, 2011 (DE) .......................... 10 2011 006 993

(51) Int. Cl.
*B23F 17/00* (2006.01)
*B23F 5/22* (2006.01)
*B23F 19/10* (2006.01)

(52) U.S. Cl.
CPC ................. *B23F 17/006* (2013.01); *B23F 5/22* (2013.01); *B23F 19/102* (2013.01);
(Continued)

(58) Field of Classification Search
CPC ............ B23F 1/065; B23F 5/22; B23F 17/00; B23F 17/006; B23F 19/00; B23F 19/10; B23F 19/02; B23F 5/24; B23F 19/102; B23F 19/104; B23F 19/105; B23F 19/107;
Y10T 29/49467; Y10T 29/49476; Y10T 409/101113; Y10T 409/10159; Y10T 409/101749

See application file for complete search history.

(56) References Cited

U.S. PATENT DOCUMENTS 2,278,300 A * 3/1942 Barter et al. ...................... 409/8
2,451,447 A  10/1948 Ransome
(Continued)

FOREIGN PATENT DOCUMENTS

| CH | 395699 | 12/1965 |
|----|--------|---------|
| DE | 2142235 | 3/1972 |

(Continued)

OTHER PUBLICATIONS

German Search Report DE 10 2011 006 993.3; 2 pages, Mar. 29, 2012.
(Continued)

*Primary Examiner* — Ryan J Walters
*Assistant Examiner* — Matthew P Travers
(74) *Attorney, Agent, or Firm* — Reising Ethington P.C.

(57) ABSTRACT

In a method for producing toothed sections on workpieces, a toothed section is firstly produced by means of a first tool in the region of a first end face of a workpiece to be toothed. The produced toothed section is reworked on the peripheral face by means of at least one second tool in the region of the first end face, while the toothed section is further produced. If the toothed section is also produced in the region of the second end face by means of the first tool, the reworking in the region of the first end face is already completed, so the toothed section can also be reworked in the region of the second end face. Short cycle times are thereby achieved with a low machine-related outlay.

12 Claims, 12 Drawing Sheets

(52) U.S. Cl.
  CPC ..... *Y10T 29/49467* (2015.01); *Y10T 29/49476* (2015.01); *Y10T 409/101113* (2015.01); *Y10T 409/101749* (2015.01)

(56) References Cited

U.S. PATENT DOCUMENTS

| | | | | |
|---|---|---|---|---|
| 5,154,553 | A | * | 10/1992 | Baumstark ......................... 409/8 |
| 6,050,755 | A | | 4/2000 | Huber et al. |
| 6,571,475 | B1 | * | 6/2003 | Tomei ......................... 29/893.32 |
| 7,624,505 | B2 | | 12/2009 | Jaeger et al. |
| 2003/0210964 | A1 | * | 11/2003 | Fitzgerald et al. ............... 409/11 |
| 2007/0186398 | A1 | * | 8/2007 | Lee et al. ......................... 29/56.5 |
| 2012/0155980 | A1 | * | 6/2012 | Ronald et al. ..................... 409/8 |
| 2012/0251258 | A1 | * | 10/2012 | Masuo et al. ..................... 409/8 |

FOREIGN PATENT DOCUMENTS

| | | |
|---|---|---|
| DE | 29715092 U1 | 12/1997 |
| DE | 10211129 A1 | 10/2003 |
| DE | 102006044738 B3 | 4/2008 |
| EP | 0832716 A2 | 4/1998 |
| GB | 1297358 | 11/1972 |
| JP | 59182020 | 10/1984 |

OTHER PUBLICATIONS

International Search Report PCT/EP2012/056295; dated Jul. 4, 2012; 4 pages.

Translation of Claim 1 of CH395699; 1 page, Dec. 31, 1965.

* cited by examiner

METHOD FOR PRODUCING TOOTHED SECTIONS ON WORKPIECES

CROSS-REFERENCES TO RELATED APPLICATIONS

This application claims the priority of German Patent Application, Serial No. 10 2011 006 993.3 filed Apr. 7, 2011 and International Patent Application No. PCT/EP2012/056295, filed Apr. 5, 2012, pursuant to 35 U.S.C. 119(a)-(d), the content of which is incorporated herein by reference in its entirety as if fully set forth herein.

FIELD OF THE INVENTION

The invention relates to a method for producing toothed sections on workpieces.

BACKGROUND OF THE INVENTION

A method for machining toothed sections for workpieces is known from DE 10 2006 044 738 B3 (corresponds to U.S. Pat. No. 7,624,505 B2). The method is carried out on a machine tool having a rotary holder that can be pivoted about a main axis with two workpiece spindles. The workpiece spindles can be pivoted into a machining position and a transfer position by rotating the rotary holder about the main axis. In the machining position, a semi-finished part is firstly produced from a blank by pre-milling. Axial rough burrs produced during the pre-milling are removed on the two end faces by deburring tools. The semi-finished part is then transferred into the transfer position, where a chamfering of the semi-finished part on the two end faces of the workpiece takes place by means of chamfering tools. Axial fine burrs produced during the chamfering are removed by further deburring tools, so an axially deburred and chamfered semi-finished part is produced. The chamfered semi-finished part is then transferred back into the machining position, where radial fine burrs produced during the chamfering are removed by fine milling and the finished part, in other words the toothed and completely deburred workpiece, is thus produced. The finished part is then transferred into the transfer position again and replaced by a new blank to be machined. The axial deburring and chamfering in each case takes place by means of two deburring tools or chamfering tools, which simultaneously machine the workpiece to be toothed in the region of the two end faces. Furthermore, two workpieces can be machined in parallel by the two workpiece spindles, so toothed and completely deburred workpieces can be manufactured quickly and economically. The drawback is that the machine-related outlay required to carry out this method is high.

SUMMARY OF THE INVENTION

The invention is based on an object of providing a method, which allows easy and quick production of toothed sections on workpieces with a low machine-related outlay.

BRIEF DESCRIPTION OF THE INVENTION

This object is achieved by a method for producing toothed sections on workpieces having the following steps:
providing a workpiece to be toothed, wherein the workpiece
has a centre longitudinal axis,
a first end face running transverse to the centre longitudinal axis,
a second end face running transverse to the centre longitudinal axis and
a peripheral face running about the centre longitudinal axis and between the end faces,
producing a toothed section on the peripheral face in the region of the first end face by means of a first tool,
reworking the toothed section produced in the region of the first end face to remove burrs produced during the production of the toothed section by means of at least one second tool, wherein
the reworking takes place at least on the peripheral face of the toothed section produced and
the reworking takes place during the further production of the toothed section,
producing the toothed section in the region of the second end face by means of the first tool, and
reworking the toothed section produced in the region of the second end face to remove burrs produced during the production of the toothed section by means of the at least one second tool.

According to the invention, it was recognized that the production of toothed workpieces is possible with a high productivity and a comparatively low machine-related outlay if the reworking of the produced toothed section is begun directly after the production of the toothed section in the region of the first end face, so the reworking of the produced toothed section in the region of the first end face takes place in parallel in terms of time or simultaneously with the further production of the toothed section. For this it is necessary for the produced toothed section in the region of the first end face and in the region of the second end face to be able to be machined independently of one another, in other words with a time delay with respect to one another by means of the corresponding tools. After the production of the toothed section in the region of the first end face, radial burrs produced during the toothing in the region of the first end face or in the region of the already produced toothed section and optionally also axial burrs on the first end face are thus removed in parallel in terms of time with the further production of the toothed section. The reworking of the toothed section in the region of the first end face is completed at least simultaneously with the production of the toothed section in the region of the second end face, so the at least one second tool can immediately continue with the reworking of the toothed section in the region of the second end face. During the reworking of the toothed section on the peripheral face, in particular radial burrs on the tooth tips and tooth flanks are removed. The reworking can, for example, take place with a chamfering tool and/or a deburring tool, such as, for example, a brush, a grinding disc or a milling cutter. If necessary, after the reworking, a finishing of the produced toothed section can also take place, in which axial and/or radial fine burrs or secondary burrs are removed.

A method, in which radial burrs on the peripheral face are removed during reworking and the removal of the radial burrs in the region of the first end face takes place independently in terms of time from the removal of the radial burrs in the region of the second end face, ensures the removal of radial burrs in the region of the first end face in parallel in terms of time with the further production of the toothed section. Since the radial burrs in the region of the first end face can be removed independently in terms of time, in other words with a time interval from the radial burrs in the region of the second end face, it is possible to remove the radial burrs in parallel in terms of time with respect to the production of the toothed section. As a result, short cycle times are achieved during the toothing. The removal of the radial burrs may, for example, take place by chamfering.

A method, in which axial burrs on the end faces are removed during reworking and the removal of the axial burrs on the first end face takes place independently in terms of time from the removal of the axial burrs on the second end face, ensures a removal of the axial burrs on the first end face in parallel in terms of time with the further production of the toothed section. Since the axial burrs on the first end face can be removed independently in terms of time, in other words with a time interval with respect to the axial burrs on the second end face, a removal of the axial burrs is possible in parallel in terms of time with the toothed section production. As a result, short cycle times are achieved when toothing workpieces.

A method according, in which the reworking of the toothed section produced in the region of the first end face comprises the following steps:

chamfering the produced toothed section by means of a chamfering tool and removing radial rough burrs during chamfering, and removing axial burrs on the first end face by means of a deburring tool, allows a chamfered and axially deburred toothed section to be produced easily and quickly in the region of the first end face. The axial burrs produced during the production of the toothed section and during the chamfering are preferably removed simultaneously with the chamfering by means of the deburring tool. Radial fine or secondary burrs produced during the chamfering can be removed during a subsequent finishing.

A method, in which the chamfering of the produced toothed section and the removal of the axial burrs take place at least partially simultaneously, allows a short cycle time during the production of workpieces with a chamfered toothed section. A method, in which the reworking of the toothed section produced in the region of the second end face comprises the following steps:

chamfering the produced toothed section by means of a chamfering tool and removing radial rough burrs during chamfering, and removing axial burrs on the second end face by means of a deburring tool, allows a chamfered and axially deburred toothed section to be produced easily and quickly in the region of the second end face without axial burrs. The axial burrs produced during the production of the toothed section and during chamfering are preferably removed simultaneously with the chamfering by means of the deburring tool. Radial fine or secondary burrs produced during the chamfering can be removed during a subsequent finishing.

A method, in which the chamfering of the produced toothed section and the removal of the axial burrs take place at least partially simultaneously, allows a short cycle time during the production of workpieces with a chamfered toothed section.

A method, comprising a finishing of the produced toothed section to remove burrs that still remain after the reworking, allows the production of workpieces with a qualitatively high-value toothed section without any burrs. Finishing is necessary, in particular, when radial fine or secondary burrs have been produced during chamfering. The finishing preferably takes place by means of the first tool, which was already used to produce the toothed section. The finishing takes place, for example, in the same direction as the production of the toothed section, in other words proceeding from the first end face to the second end face. Alternatively, the finishing can take place in the opposite direction to the production of the toothed section, in other words proceeding from the second end face to the first end face.

A method, in which the finishing takes place during the reworking of the toothed section produced in the region of the second end face, allows easy and quick finishing of the produced toothed section. Since the finishing takes place at least partially in parallel in terms of time or simultaneously with the reworking of the toothed section produced in the region of the second end face, a short cycle time is achieved in the production of the toothed section. The finishing preferably takes place by means of the first tool.

A method, in which radial fine burrs produced by the chamfering are removed by means of the first tool during the finishing, easily and quickly allows the removal of radial fine burrs produced by the chamfering.

A method, in which the first tool is configured as a milling tool, easily allows the production and finishing of the toothed section.

A method, in which a deburring tool is provided, which is pivotable about an associated pivot axis by at least 180° to remove axial burrs on the two end faces, easily allows an independent removal of axial burrs on the two end faces. Since precisely one deburring tool is provided that can be pivoted about an associated pivot axis by 180°, the one end face can firstly be deburred, followed by the other end face after pivoting the deburring tool by 180°.

A method, in which a chamfering tool is provided, which is pivotable about an associated pivot axis by at least 180° to chamfer the produced toothed section in the region of the two end faces, easily allows an independent chamfering of the produced toothed section in the region of the two end faces. Since precisely one chamfering tool is provided that can be pivoted about an associated pivot axis by 180°, the toothed section in the region of the one end face can firstly be chamfered, followed by the tooth section in the region of the other end face after pivoting the chamfering tool by 180°.

A method, in which to remove axial burrs on the end faces, two deburring tools are arranged on a common tool carrier and an axial spacing of the deburring tools is greater than an axial spacing of the end faces, easily allows the independent removal of axial burrs on the two end faces. Since two deburring tools are arranged on a common tool carrier and their axial spacing is greater than the axial spacing of the end faces, only one end face is always deburred. To deburr the respective other end face, the tool carrier has to be axially moved together with the deburring tools.

A method, in which to chamfer the produced toothed section, two chamfering tools are arranged on a common tool carrier and an axial spacing of the chamfering tools is greater than an axial spacing of the end faces, allows the independent chamfering of the produced toothed section in the region of the two end faces. Since two chamfering tools are arranged on a common tool carrier and their axial spacing is greater than the axial spacing of the end faces, the toothed section is always only chamfered in the region of one of the end faces. To chamfer the toothed section in the region of the respective other end face, the tool carrier has to be axially moved together with the chamfering tools.

Further features, advantages and details of the invention emerge from the following description of a plurality of embodiments.

DESCRIPTION OF THE PREFERRED EMBODIMENTS

Figure 1:
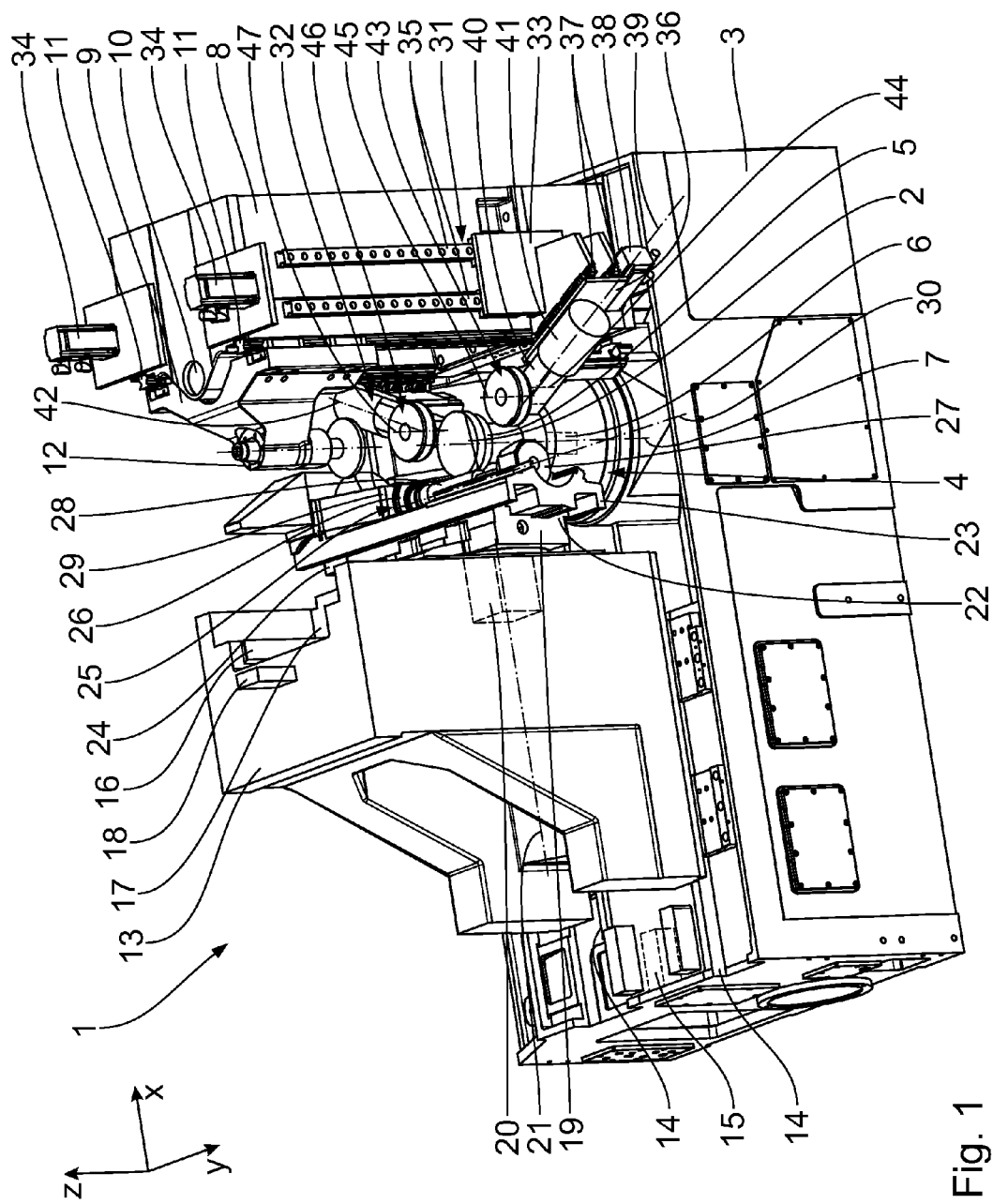
FIG. 1 shows a perspective view of a machine tool for producing toothed sections on workpieces according to a first embodiment.

A first embodiment of the invention will be described below with reference to FIGS. 1 to 12. A machine tool 1 for producing toothed sections on workpieces 2 has a machine bed 3, on which a workpiece spindle 4 is arranged upright. The workpiece spindle 4 has a workpiece receiver 5, which can be rotatably driven about a vertically running rotational axis 7 by means of a drive motor 6. The rotational axis 7 runs parallel to a vertical z-direction and is called the C-axis.

A first stand 8 is rigidly arranged on the machine bed 3 in a horizontal x-direction laterally next to the workpiece spindle 4. Arranged on a front side of the stand 8 facing the workpiece spindle 4 is a first z-slide 9, which can be linearly moved by means of a first z-drive motor 10 on first z-guide rails 11 parallel to the z-direction. A counter-workpiece receiver 12 is arranged concentrically with respect to the rotational axis 7 on the z-slide 9. The counter-workpiece receiver 12 is rotatably mounted about the rotational axis 7 and is used to receive undulating workpieces 2.

A second stand 13 is linearly movably arranged on the machine bed 3 opposite the stand 8. For this purpose, x-guide rails 14, on which the stand 13 can be linearly moved in the x-direction by means of an x-drive motor 15, is fastened on the machine bed 3. Second z-guide rails 16, on which a second z-slide 17 can be linearly moved parallel to the z-direction by means of a second z-drive motor 18, are arranged on a front side of the stand 13 facing the workpiece spindle 4.

A rotary part 19, which can be pivoted about a rotational axis 21 running parallel to the x-direction by means of a drive motor 20, is arranged on the z-slide 17. The rotational axis 21 is also called the A-axis. Arranged on the rotary part 19 are y-guide rails 22, on which a y-slide 23 can be linearly moved by means of a y-drive motor 24. With a horizontal orientation of the rotary part 19, the y-guide rails 22 run parallel to a horizontal y-direction, so the y-slide 23 can be linearly moved parallel to this y-direction. The x-, y- and z-directions in each case run perpendicular to one another and form a Cartesian coordinate system.

Arranged on the y-slide 23 is a first machining unit 25 for machining a workpiece 2 configured as a milling unit. The machining unit 25 has a tool receiver 26 and a counter-tool receiver 27 arranged opposite to receive a first tool 28 configured as a milling tool or hob. The tool receiver 26 can be rotatably driven about a rotational axis 30 running parallel to the y-guide rails 22 by means of a drive motor 29. The rotational axis 30 is also called the B-axis. The hob 28 can therefore be rotatably driven about the B-axis.

A second machining unit 31 and a third machining unit 32 are arranged laterally on the stand 8. The machining units 31, 32 are configured identically, so only the machining unit 31 will be described in detail below. The machining unit 31 has a third z-slide 33, which can be linearly moved by means of a third z-drive motor 34 on third z-guide rails 35 parallel to the z-direction. The z-guide rails 35 are fastened laterally on the stand 8. Arranged on the z-slide 33 is a feed slide 36, which can be linearly moved on guide rails 37 by means of a drive motor 38 in a feed direction. The feed direction runs in the x-y-plane at an angle of about 30° to 50° to the y-direction and defines a linear feed axis 39.

Arranged on the feed slide 36 is a tool holder 40, which can be pivoted by at least 180° about a pivot axis 39 coinciding with the feed axis by means of a drive motor 41. The pivot axis 39 is therefore identical to the feed axis 39. The pivot axis 39 intersects the rotational axis 7.

Arranged at the free end of the tool holder 40 is a second tool 43, which can be rotatably driven about a rotational axis 45 running parallel to the z-direction by means of a drive motor 44, integrated in the tool holder 40. Correspondingly, the third machining unit 32 has a third tool 46, which can be pivoted about the pivot axis 42 and can be rotatably driven about an associated rotational axis 47.

The method for producing a toothed section on the workpiece 2 will be described below with the aid of FIGS. 2 to 12. For reasons of clarity, only the workpiece 2 and the tools 28, 43 and/or 46 that are in each case in engagement with workpiece 2 are shown in the figures.

The workpiece 2 has a first end face 48 and an opposing second end face 49, which run transverse or perpendicular to a centre longitudinal axis 50 of the workpiece 2. Between the end faces 48, 49, the workpiece 2 has a peripheral face 51 running annularly about the centre longitudinal axis 50 and parallel to the centre longitudinal axis 50. A toothed section 52 with teeth 53 and tooth gaps 54 is to be produced on the peripheral face 51.

This still unmachined workpiece 2 is firstly clamped in the workpiece receiver 5 rotatably driven about the rotational axis 7. When the workpiece 2 is in the clamped state, the rotational axis 7 coincides with the centre longitudinal axis 50. The hob 28 is then rotatably driven about the rotational axis 30 and fed to the workpiece 2 in such a way that proceeding from the first end face 48, the toothed section 52 is produced on the peripheral face 51. The hob 28 is moved in the z-direction to produce the toothed section 52.

Figure 3:
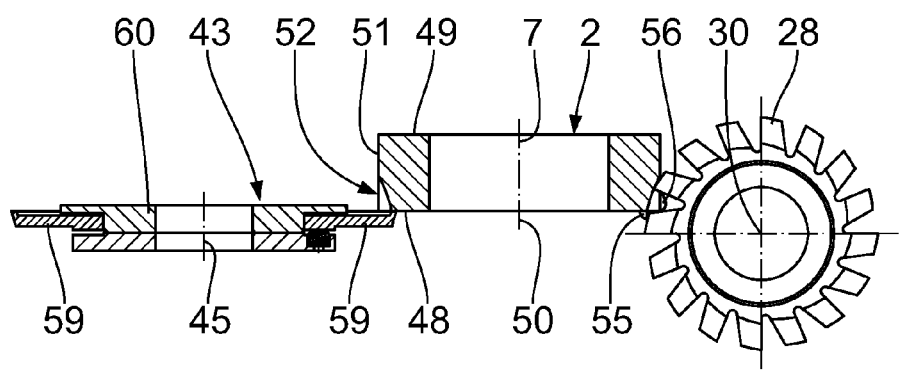
FIG. 3 shows a sectional view along the section line III-III in FIG. 2.

After the initial cut of the hob 28, during the production of the toothed section 52, axial rough or primary burrs 55 and radial rough or primary burrs 56 are produced. The axial rough burrs 55 occur on the first end face 48, whereas the radial rough burrs 56 occur on the peripheral face 51, in particular on the tooth tips 57, and partially also on the tooth flanks 58 of the teeth 53. The rough burrs 55, 56 are indicated in FIG. 3.

Figure 2:
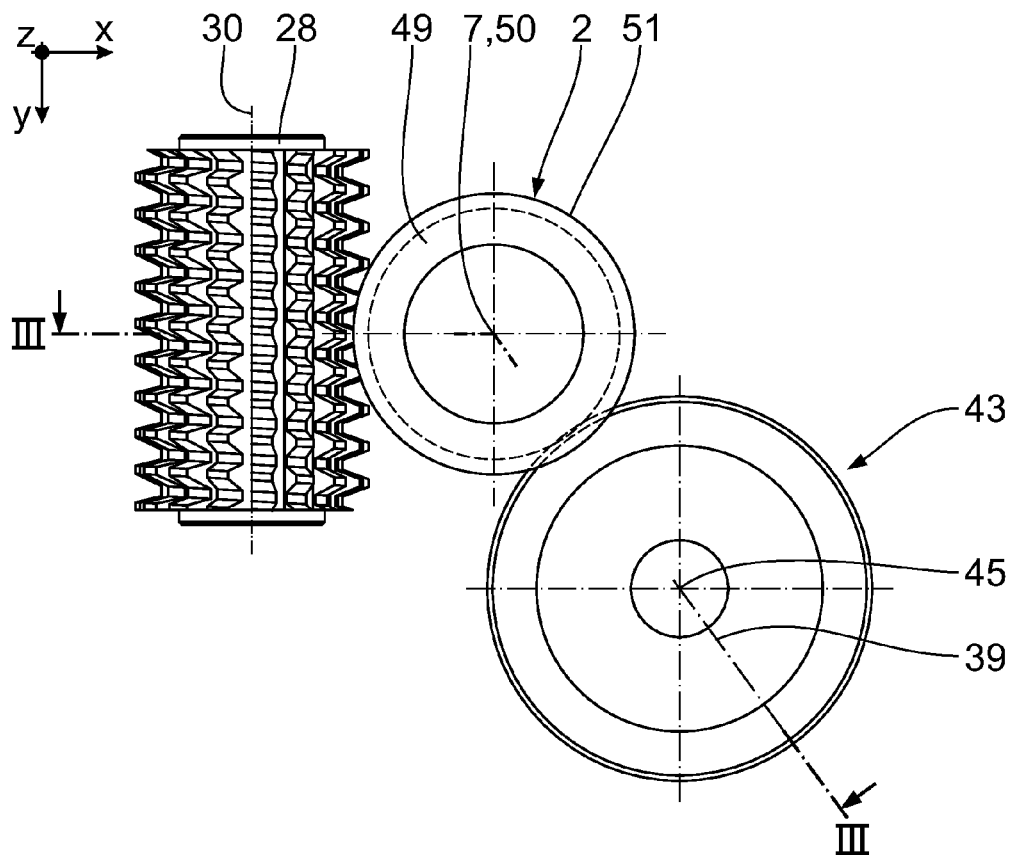
FIG. 2 shows a plan view of a workpiece to be toothed by means of the machine tool in FIG. 1 at the beginning of the production of a toothed section.

Once the toothed section 52 has been formed in the region of the first end face 48, the second tool 43 is fed to the workpiece 2 and rotatably driven about the rotational axis 45 to remove the axial rough burrs 55. This machining state is illustrated in FIGS. 2 and 3. The tool 43 is configured as a deburring tool and has a plurality of blades 59, which are arranged in the usual manner on a disc-shaped base body 60. The deburring tool 43 is rotatably driven about the rotational axis 45 and the axial rough burrs 55 thus removed by means of the blades 59 from the first end face 48. Alternatively, the deburring tool 43 may only have one blade 59. This deburring tool 43 does not have to be rotatably driven during the deburring, but can merely also be entrained for deburring by the rotatably driven workpiece 2. The removal of the axial rough burrs 55 takes place in parallel in terms of time with the further production of the toothed section 52 by means of the hob 28.

Figure 4:
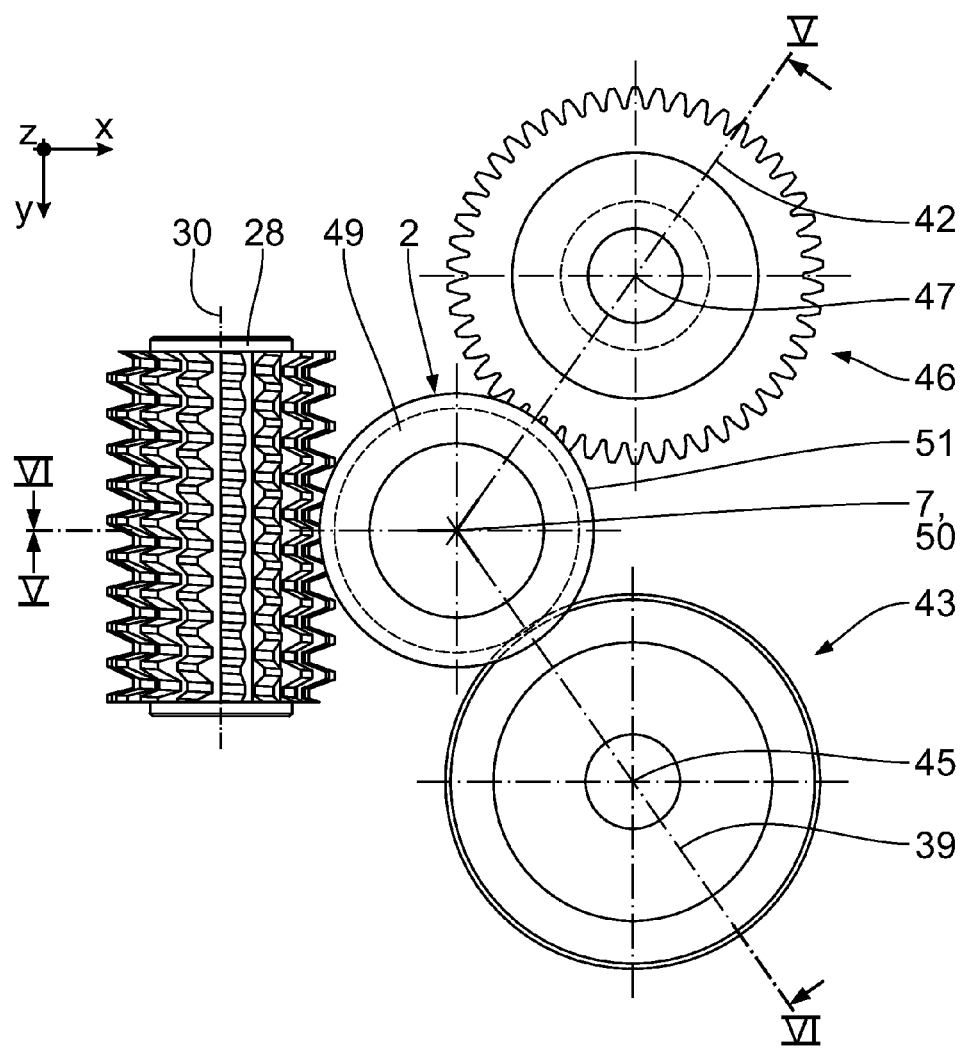
FIG. 4 shows a plan view of the workpiece at the beginning of the chamfering of the toothed section in the region of a first end face of the workpiece.
Figure 5:
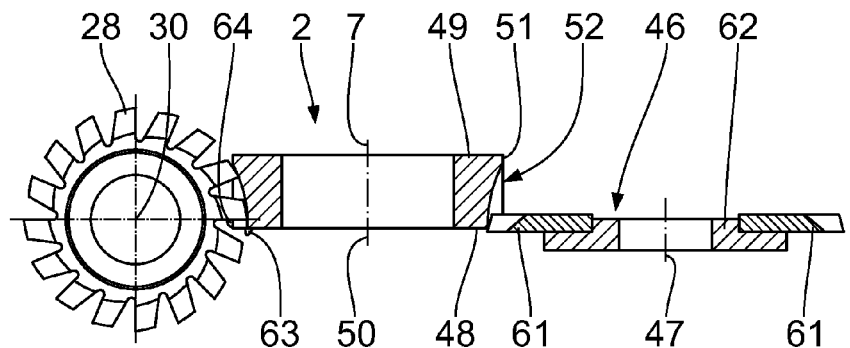
FIG. 5 shows a sectional view along the section line V-V in FIG. 4.
Figure 6:
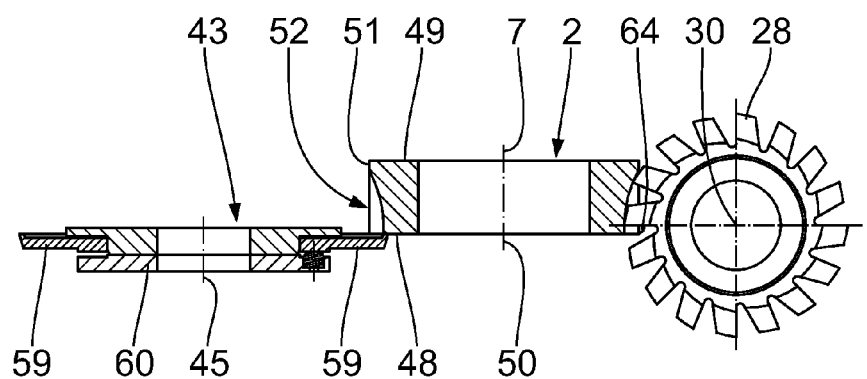
FIG. 6 shows a sectional view along the section line VI-VI in FIG. 4.

If the toothed section 52 is adequately formed in the region of the first end face 48, the third tool 46 formed as a chamfering tool is fed to the workpiece 2 to chamfer the toothed section 52. The chamfering tool 46 has a plurality of chamfering elements 61, which are arranged on a disc-shaped base body 62. To chamfer the teeth 53 in the region of the first end face 48, the chamfering tool 46 is rotatably driven about the associated rotational axis 47. During the chamfering, the radial rough burrs 56 are removed and axial fine or secondary burrs 63 are produced as well as radial fine or secondary burrs 64. The axial fine burrs 63 in turn occur on the first end face 48, whereas the radial fine burrs 64 occur on the peripheral face 51, in particular on the tooth tips 57, and partially also on the tooth flanks 58 of the teeth 53. The chamfering in the region of the first end face 48 is illustrated in FIGS. 4 to 6. Since the deburring tool 43 is still engaged with the workpiece 2 on the first end face 48, the axial fine burrs 63 produced during the chamfering are also removed during the chamfering.

The reworking of the produced toothed section 52 in the region of the first end face 48 accordingly comprises the removal of axial rough and fine burrs 55, 63 and the removal of radial rough burrs 56, which have been produced during the production of the toothed section 52 and during the chamfering of the toothed section 52. The reworking takes place in parallel in terms of time or simultaneously with the further production of the toothed section 52 by means of the hob 28.

Figure 8:
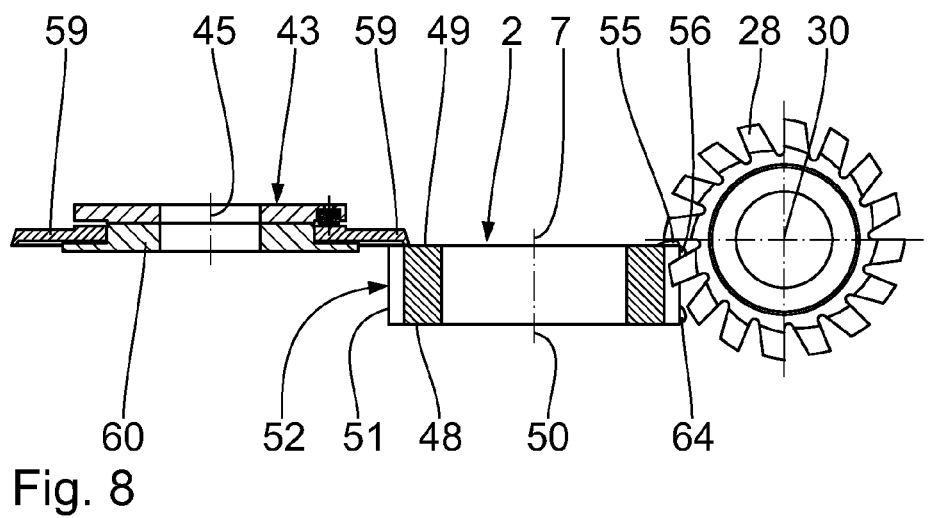
FIG. 8 shows a sectional view along the section line VIII-VIII in FIG. 7.

The hob 28 is moved continuously in the z-direction to produce the toothed section 52 on the entire peripheral face 51 until the toothed section 52 is also produced in the region of the second end face 49. In this case, axial rough burrs 55 are in turn produced on the second end face 49 and radial rough burrs 56 are produced on the peripheral face 51. This is illustrated in FIG. 8.

Figure 7:
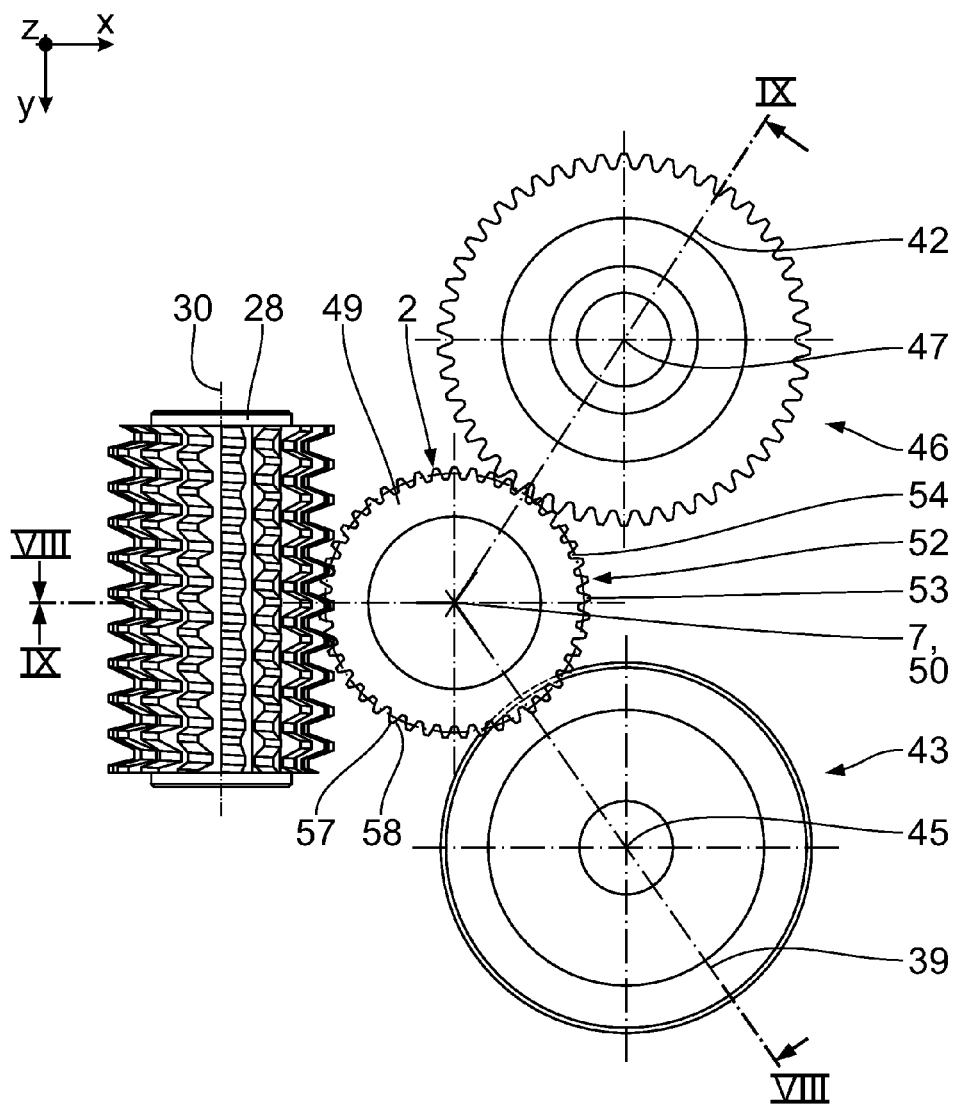
FIG. 7 shows a plan view of the workpiece at the beginning of the chamfering of the toothed section in the region of a second end face of the workpiece.
Figure 9:
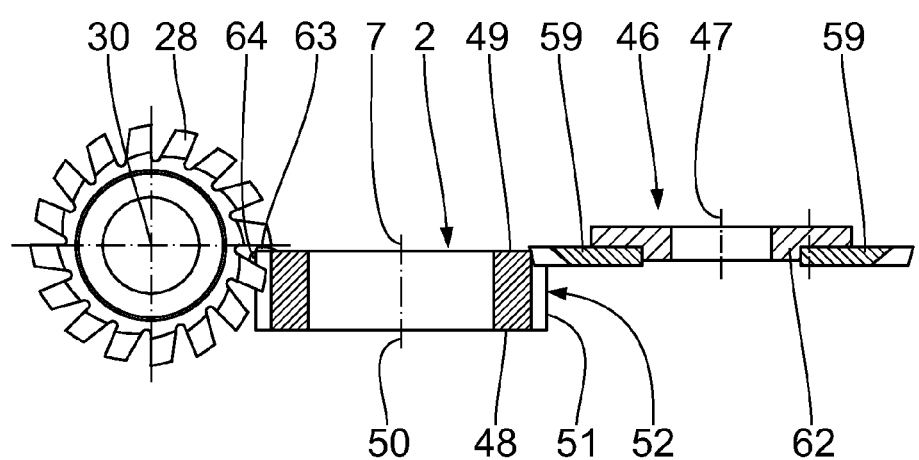
FIG. 9 shows a sectional view along the section line IX-IX in FIG. 7.

Once the toothed section 52 has been chamfered on the first end face 48 and deburred, the deburring tool 43 and the chamfering tool 46 are removed from the workpiece 2, pivoted by 180° about their respective pivot axis 39, 42 and moved linearly in the z-direction to the second end face 49. In the meantime, the toothed section 52 was also completely produced in the region of the second end face 49 by means of the hob 28. The deburring tool 43 and the chamfering tool 46 are now fed to the workpiece 2 again, so axial rough and fine burrs 55, 63 are removed by means of the deburring tool 43 and radial rough burrs 56 are removed by means of the chamfering tool 46 during the chamfering in the manner already described. The chamfering and deburring in turn take place in parallel in terms of time, in other words at least partially simultaneously. The deburring on the second end face 49 and the chamfering of the toothed section 52 as well as the removal of radial rough burrs 56 in the region of the second end face 49 is illustrated in FIGS. 7 to 9.

Figure 10:
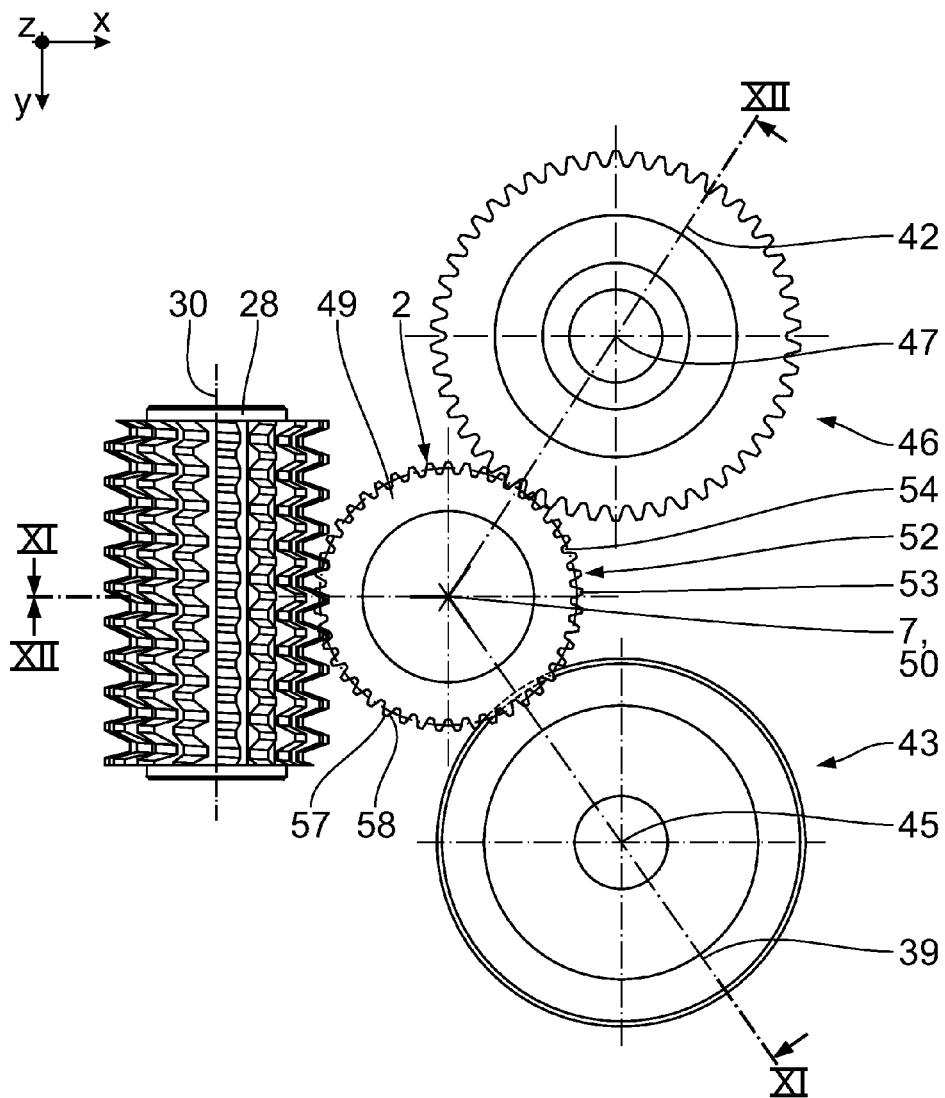
FIG. 10 shows a plan view of the workpiece during finishing.
Figure 11:
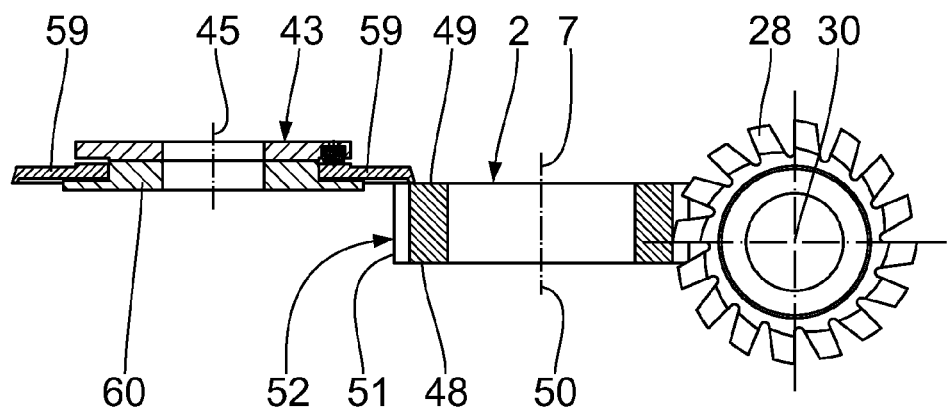
FIG. 11 shows a sectional view along the section line XI-XI in FIG. 10.
Figure 12:
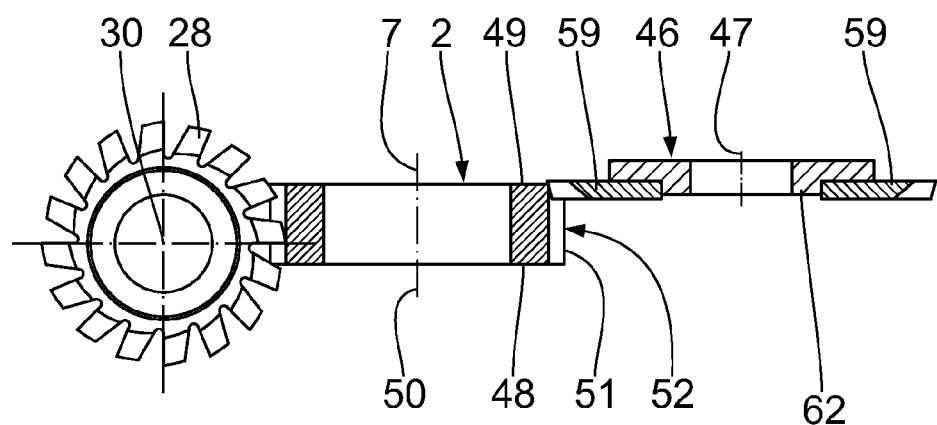
FIG. 12 shows a sectional view along the section line XII-XII in FIG. 10.

The radial fine burrs 64 still remaining after the chamfering and removal of the axial burrs 55, 63 are removed by finishing the produced toothed section 52. The finishing takes place by means of the hob 28 and is called a finishing cut. Once the toothed section 52 in the region of the second end face 49 has been completed, the linear movement direction of the hob 28 is changed. The hob 28 is now moved linearly again in the direction of the first end face 48 parallel to the z-direction proceeding from the second end face 49. The radial fine burrs 64 in the region of the second end face 49 and the first end face 48 are removed here. Alternatively, the finishing can take place in such a way that the hob 28 is moved linearly in the direction of the second end face 49 proceeding from the first end face 48. The finishing takes place in parallel in terms of time with the reworking of the toothed section 52 in the region of the second end face 49 by means of the deburring tool 43 and the chamfering tool 46. The finishing is illustrated in FIGS. 10 to 12. FIGS. 11 and 12 show the completely toothed, chamfered and deburred workpiece 2.

The configuration of the deburring tool 43 and its pivotability about the associated pivot axis 39 make it possible to remove axial burrs 55, 63 on the first end face 48 independently in terms of time from axial burrs 55, 63 on the second end face 49. Correspondingly, the configuration of the chamfering tool 46 and its pivotability about the associated pivot axis 42 make it possible to chamfer the toothed section 52 in the region of the first end face 48 and in the region of the second end face 49 independently in terms of time and to remove radial rough burrs 56. Owing to this independent reworking of the toothed section 52, it is possible to carry out the production, the reworking and optionally the finishing of the toothed section 52 substantially in parallel in terms of time. As a result, short cycle times are achieved in the toothing of workpieces 2, although the machine tool 1 only has one workpiece spindle 4 and therefore always only one workpiece 2 can be machined. By means of the method according to the invention, a high productivity can therefore be achieved with a low machine-related outlay in the toothing of workpieces 2.

A second embodiment of the invention will be described below with the aid of FIGS. 13 to 16. The machine tool 1 corresponds to the machine tool described in the first embodiment but with the difference that the tools 43, 46 are not pivotable and exclusively linear feed axes 39, 42 and no pivot axes are formed. The machine tool 1 therefore has a simplified structure.

For reworking the tool 2 on both sides, the machining unit 31 has two deburring tools 43, which are arranged opposing one another on a common tool carrier 65. So that the first end face 48 can be deburred independently of the second end face 49, the deburring tools 43 have a spacing $A_E$ from one another in the z-direction that is greater than the spacing $A_W$ of the end faces 48, 49 of the workpiece 2. Accordingly, the machining unit 32 has two chamfering tools 46, which are fastened opposing one another on a common tool carrier 66. For the independent chamfering of the toothed section 52 in the region of the first end face 48 and in the region of the second end face 49, the chamfering tools 46 have a spacing $A_A$ from one another in the z-direction that is greater than the spacing $A_W$.

Figure 13:
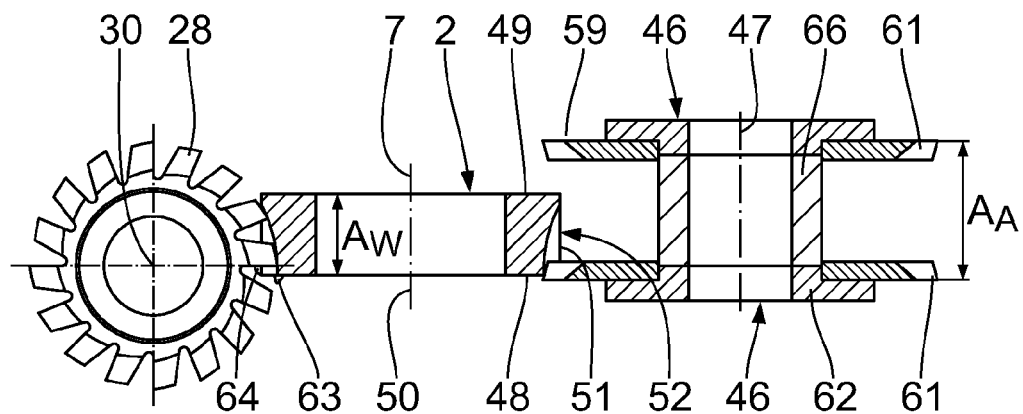
FIG. 13 shows a sectional view corresponding to FIG. 5 according to a second embodiment.
Figure 14:
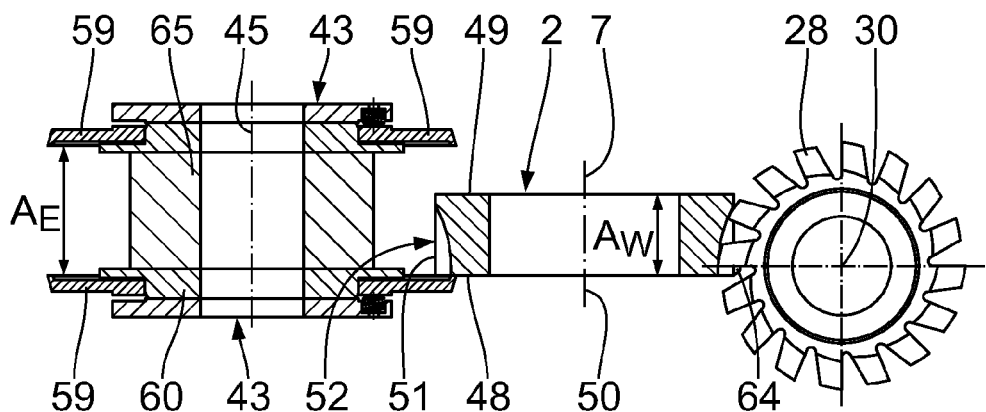
FIG. 14 shows a sectional view corresponding to FIG. 6 according to a second embodiment.
Figure 15:
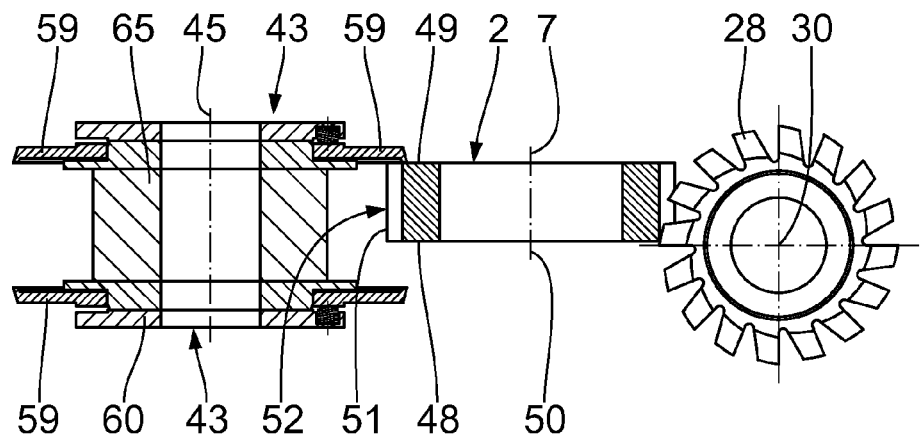
FIG. 15 shows a sectional view corresponding to FIG. 11 according to a second embodiment.
Figure 16:
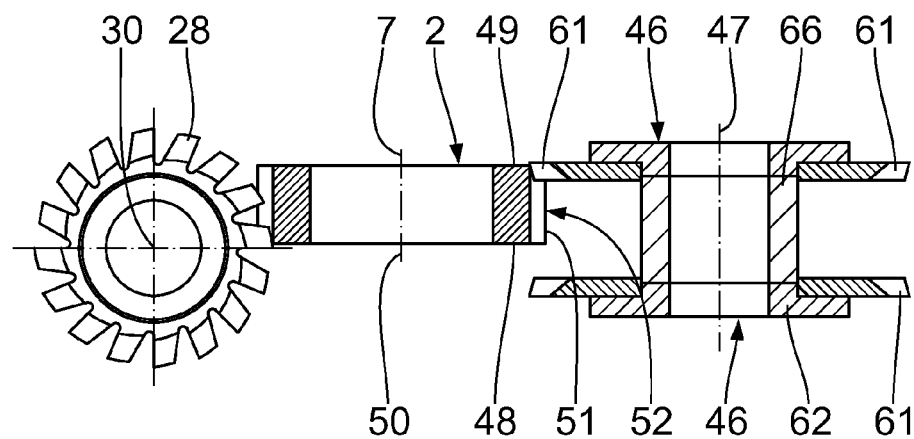
FIG. 16 shows a sectional view corresponding to FIG. 12 according to a second embodiment.

The production and reworking of the toothed section 52 in the region of the first end face 48 takes place in the manner already described and is illustrated in FIGS. 13 and 14. To rework the toothed section 52 in the region of the second end face 49, the tool carriers 65, 66 are linearly moved together with the tools 43, 46 arranged thereon, so the tools 43, 46 associated with the second end face 49 engage with the workpiece 2. This is illustrated in FIGS. 15 and 16. With regard to the further mode of functioning of the machine tool 1 and the further sequence of the method, reference is made to the first embodiment.

Figure 17:
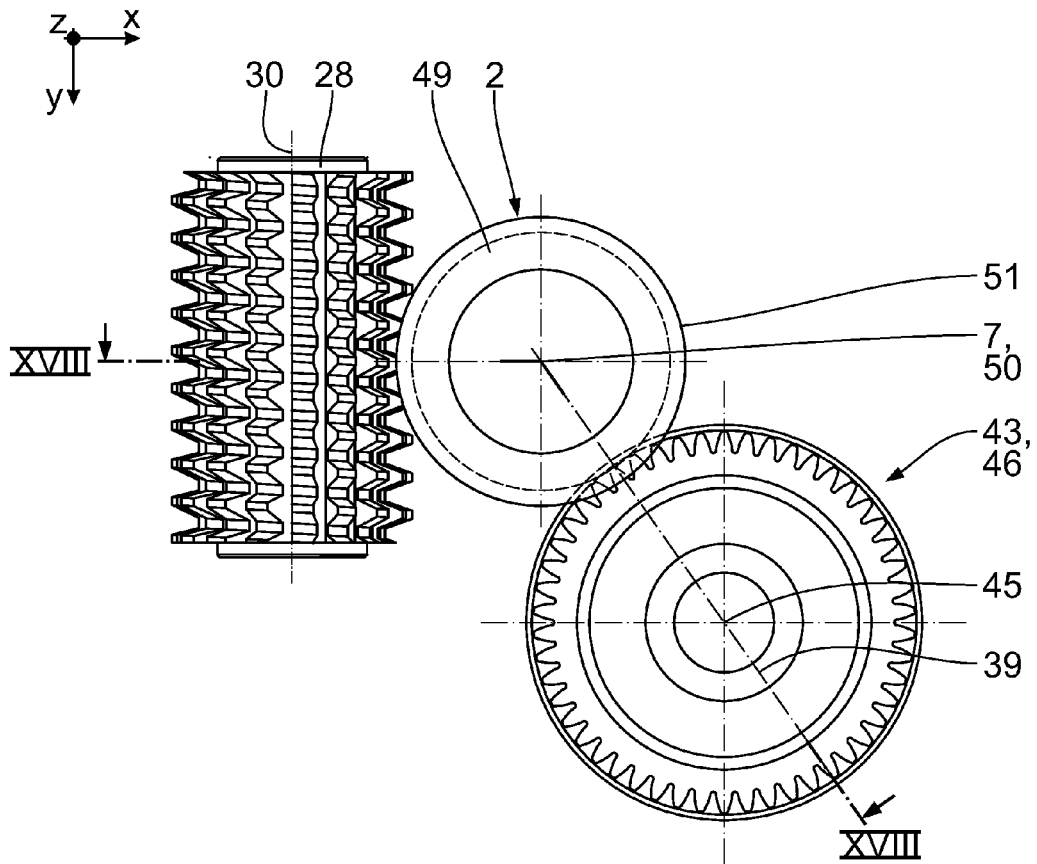
FIG. 17 shows a plan view of a workpiece to be toothed according to a third embodiment by means of a machine tool during the production of the toothed section in the region of the first end face of the workpiece.
Figure 18:
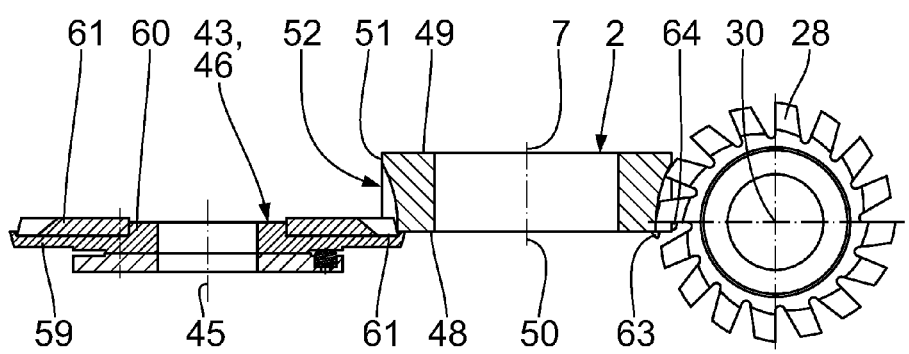
FIG. 18 shows a sectional view along the section line XVIII-XVIII in FIG. 17.
Figure 19:
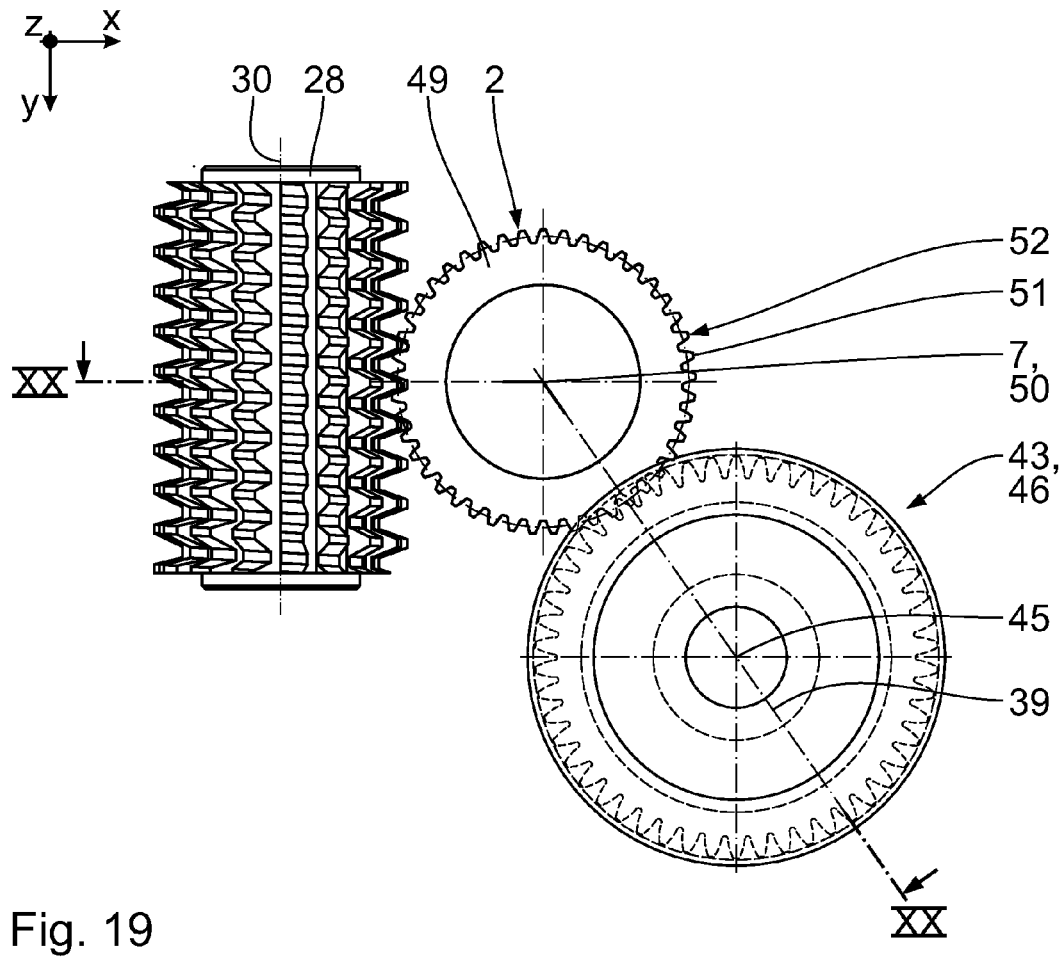
FIG. 19 shows a plan view of the workpiece during finishing.
Figure 20:
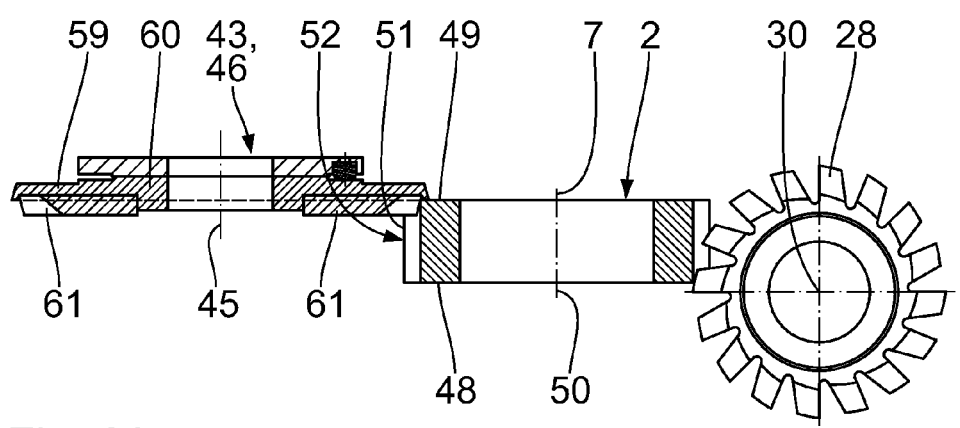
FIG. 20 shows a sectional view along the section line XX-XX in FIG. 19.

A third embodiment of the invention will be described below with the aid of FIGS. 17 to 20. The machine tool 1, in contrast to the first embodiment, has only the machining units 25 and 31. Since the machining unit 32 is dispensed with, the machine tool 1 has a simpler construction. The deburring tool 43 and the chamfering tool 46 are combined into a combined tool and arranged on a common base body 60. The reworking of the toothed section 52 produced in the region of the first end face 48 takes place in parallel in terms of time with the further production of the toothed section 52 by means of the hob 28. This is illustrated in FIGS. 17 and 18. To rework the toothed section 52 in the region of the second end face 49, the combined tool is pivoted by 180° about the pivot axis 39 in accordance with the first embodiment. This is illustrated in FIGS. 19 and 20. With regard to the further mode of functioning of the machine tool 1 and the further method sequence, reference is made to the first embodiment.

According to a fourth embodiment of the invention, the machine tool 1 is formed in accordance with the third embodiment but the machining unit 31 has no pivot axis, so only the feed axis 39 is formed. The machining unit 31 has two combined tools in accordance with the third embodiment, which are arranged on a common tool carrier, as has already been illustrated in principle with regard to the second embodiment. Once the toothed section 52 produced in the region of the first end face 48 has been reworked with the associated first combined tool, the tool carrier is linearly moved together with the combined tools in the z-direction until the combined tool associated with the second end face 49 engages with the workpiece 2. With regard to the further mode of functioning of the machine tool 1 and the further method sequence, reference is made to the second and third embodiments.

The machining units 31, 32 including the tools 43, 46 can in principle be formed in any desired manner as long as the workpiece 2 in the region of the two end faces 48, 49 can be reworked independently of one another. This makes it possible to carry out the production, the reworking and optionally also the finishing substantially in parallel in terms of time, so that a high productivity in the toothing of workpieces 2 is achieved with a low machine-related outlay. In particular, it is also possible to use the method according to the invention to produce a plurality of toothed sections 52 on one workpiece 2. Undulating workpieces 2 can—if necessary—additionally be mounted in the counter-workpiece receiver 12.

What is claimed is:

1. A method for producing toothed sections on workpieces having the following steps:
   providing a workpiece to be toothed, wherein the workpiece has:
   a centre longitudinal axis;
   a first end face running transverse to the centre longitudinal axis;
   a second end face running transverse to the centre longitudinal axis; and
   a peripheral face running about the centre longitudinal axis and between the end faces;
   producing a toothed section on the peripheral face in the region of the first end face by means of a first tool;
   reworking the toothed section produced in the region of the first end face to remove burrs produced during the production of the toothed section by means of at least one second tool, wherein;
   the reworking takes place at least on the peripheral face of the toothed section produced; and,
   the reworking takes place during the further production of the toothed section, wherein the toothed section is further produced by moving the first tool in the direction of the centre longitudinal axis;
   producing the toothed section in the region of the second end face by means of the first tool; and,
   reworking the toothed section produced in the region of the second end face to remove burrs produced during the production of the toothed section by means of the at least one second tool, wherein the reworking of the toothed section produced in the region of the first end face comprises the following steps:
   chamfering the produced toothed section by means of a chamfering tool and removing radial rough burrs during chamfering; and,
   removing axial burrs on the first end face by means of a deburring tool,
   wherein the chamfering of the produced toothed section and the removal of the axial burrs take place at least partially simultaneously;
   wherein the chamfering tool has a rotational axis and is pivotable about an associated pivot axis by at least 180° to chamfer the produced toothed section in the region of the two end faces, wherein said pivot axis intersects the centre longitudinal axis of the workpiece.

2. A method according to claim 1, wherein radial burrs on the peripheral face are removed during reworking and the removal of the radial burrs in the region of the first end face takes place independently in terms of time from the removal of the radial burrs in the region of the second end face.

3. A method according to claim 1, wherein axial burrs on the end faces are removed during reworking and the removal of the axial burrs on the first end face takes place independently in terms of time from the removal of the axial burrs on the second end face.

4. A method according to claim 1, wherein the reworking of the toothed section produced in the region of the second end face comprises the following steps:
   chamfering the produced toothed section by means of a chamfering tool and removing radial rough burrs during chamfering; and,
   removing axial burrs on the second end face by means of a deburring tool.

5. A method according to claim 4, wherein the chamfering of the produced toothed section and the removal of the axial burrs take place at least partially simultaneously.

6. A method according to claim 1, comprising a finishing of the produced toothed section to remove burrs that still remain after the reworking.

7. A method according to claim 6, wherein the finishing takes place during the reworking of the toothed section produced in the region of the second end face.

8. A method according to claim 6, wherein radial fine burrs produced by the chamfering are removed by means of the first tool during the finishing.

9. A method according to claim 1, wherein the first tool is configured as a milling tool.

10. A method according to claim 1, wherein the deburring tool has a rotational axis and is pivotable about an associated pivot axis by at least 180° to remove axial burrs on the two end faces, wherein said pivot axis intersects the centre longitudinal axis of the workpiece.

11. A method according to claim 1, wherein to remove axial burrs on the end faces, the deburring tool and a second deburring tool are arranged on a common tool carrier and an axial spacing of the deburring tools is greater than an axial spacing of the end faces.

12. A method for producing toothed sections on workpieces having the following steps:
   providing a workpiece to be toothed, wherein the workpiece has:
   a centre longitudinal axis;
   a first end face running transverse to the centre longitudinal axis;
   a second end face running transverse to the centre longitudinal axis; and
   a peripheral face running about the centre longitudinal axis and between the end faces;
   producing a toothed section on the peripheral face in the region of the first end face by means of a first tool;
   reworking the toothed section produced in the region of the first end face to remove burrs produced during the production of the toothed section by means of at least one second tool, wherein;
   the reworking takes place at least on the peripheral face of the toothed section produced; and,
   the reworking takes place during the further production of the toothed section, wherein the toothed section is further produced by moving the first tool in the direction of the centre longitudinal axis;
   producing the toothed section in the region of the second end face by means of the first tool; and,
   reworking the toothed section produced in the region of the second end face to remove burrs produced during the production of the toothed section by means of the at least one second tool, wherein the reworking of the toothed section produced in the region of the first end face comprises the following steps:
   chamfering the produced toothed section by means of two chamfering tools and removing radial rough burrs during chamfering; and,
   removing axial burrs on the first end face by means of a deburrinq tool,
   wherein the chamfering of the produced toothed section and the removal of the axial burrs take place at least partially simultaneously;
   wherein to chamfer the produced toothed section, the chamfering tools are arranged on a common tool carrier and an axial spacing of the chamfering tools is greater than an axial spacing of the end faces, wherein the tool carrier is moved together with the chamfering tools parallel to the centre longitudinal axis to chamfer the first end face independently from the second end face.

* * * * *